United States Patent [19]

Elcock et al.

[11] Patent Number: 6,050,886
[45] Date of Patent: Apr. 18, 2000

[54] ROTARY DRUM HOLDER

[75] Inventors: Robin William Elcock, Torrance; Albert K. Yamamoto, Huntington Beach; John A. Louw, Rancho Palos Verdes, all of Calif.

[73] Assignee: Fairchild Holding Corp., Dulles, Va.

[21] Appl. No.: 09/137,402

[22] Filed: Aug. 20, 1998

Related U.S. Application Data

[62] Division of application No. 08/951,925, Oct. 16, 1997, which is a division of application No. 08/536,647, Sep. 29, 1995, Pat. No. 5,716,280.

[51] Int. Cl.[7] .................................................. B24B 41/06
[52] U.S. Cl. ...................... 451/364; 451/365; 451/401; 451/406
[58] Field of Search .................................. 451/364, 365, 451/401, 406; 269/57

[56] References Cited

U.S. PATENT DOCUMENTS

| 978,097 | 12/1910 | Wilt | 451/406 |
|---|---|---|---|
| 1,057,860 | 4/1913 | Lind | 163/1 |
| 2,009,287 | 7/1935 | Baxter et al. | 163/1 |
| 2,404,161 | 7/1946 | Bower | 451/333 |
| 2,586,953 | 2/1952 | Johnson | 451/333 |
| 2,850,849 | 9/1958 | Babbitt | 451/403 |
| 2,914,984 | 12/1959 | Ansingh . | |
| 2,931,265 | 4/1960 | De Lacy . | |
| 2,991,816 | 7/1961 | Harbison et al. . | |
| 3,124,907 | 3/1964 | Dralle . | |
| 3,217,774 | 11/1965 | Pelochino . | |
| 3,289,726 | 12/1966 | Sauter . | |
| 3,488,886 | 1/1970 | Braum et al. | 451/406 |
| 3,492,908 | 2/1970 | Thurston | 470/9 |
| 3,562,960 | 2/1971 | Thielenhaus . | |
| 3,583,461 | 6/1971 | Klaus . | |
| 3,680,263 | 8/1972 | Johnson | 451/48 |
| 3,706,948 | 12/1972 | Stanaback | 451/21 |
| 3,780,389 | 12/1973 | Lindstrom . | |
| 3,789,725 | 2/1974 | Lindstrom . | |
| 4,052,821 | 10/1977 | McCandless et al. | 451/401 |

(List continued on next page.)

FOREIGN PATENT DOCUMENTS

| 1185770 | 8/1959 | France . | |
|---|---|---|---|
| 226757 | 10/1910 | Germany . | |
| 2122035 | 11/1972 | Germany | 451/194 |
| 8166 | 9/1907 | United Kingdom | 163/6 |

Primary Examiner—Robert A. Rose
Assistant Examiner—George Nguyen
Attorney, Agent, or Firm—Christie, Parker & Hale, LLP

[57] ABSTRACT

A new machine for and method of manufacturing fluted pin fasteners and the pins produces thereby are disclosed which utilize a circular grinding arrangement of a plurality of grinders which grind flutes into a threaded pin. An internally threaded collar threads onto the pin. When the collar engages a surface of a work piece, resistance to further threading increases. When sufficient resistance to threading occurs, the driver deforms the lobes of the collar radially inward toward the axis of the collar. Material of the collar positioned internally from the lobes responds to deformation of the lobes and flows radially inward into the flutes of the pin to lock the collar, pin, and work piece together. The driver then rotates freely, and a joint has been made with a predetermined axial load thereby locking the component parts together. The apparatus grinding the flutes into the pins comprises a vibratory feed bowl loading threaded pins into a four station rotary drum assembly rotationally driven by a drive mechanism through a plurality of stations. There is a feed station to receive pins into drum assembly, a grind station to grind the pins, and an eject station to eject the ground pins. The circular arrangement of grinders is mounted on a table which is translated up and down by an air spring against a cam wheel to grind the pins located at the grinding station. These operations are performed substantially simultaneously on separate pins to provide a high rate of production.

3 Claims, 10 Drawing Sheets

U.S. PATENT DOCUMENTS

| | | | |
|---|---|---|---|
| 4,068,414 | 1/1978 | Breitenstein et al. | 451/48 |
| 4,069,855 | 1/1978 | Petroshanoff. | |
| 4,260,005 | 4/1981 | Stencel. | |
| 4,285,380 | 8/1981 | Gulistan. | |
| 4,383,353 | 5/1983 | Stencel. | |
| 4,520,595 | 6/1985 | Diener | 451/406 |
| 4,544,312 | 10/1985 | Stencel | 470/9 |
| 4,546,575 | 10/1985 | Adams | 451/48 |
| 4,565,475 | 1/1986 | Sygnator | 470/9 |
| 4,819,386 | 4/1989 | Struyf | 451/401 |
| 4,921,378 | 5/1990 | Kytola | 409/221 |

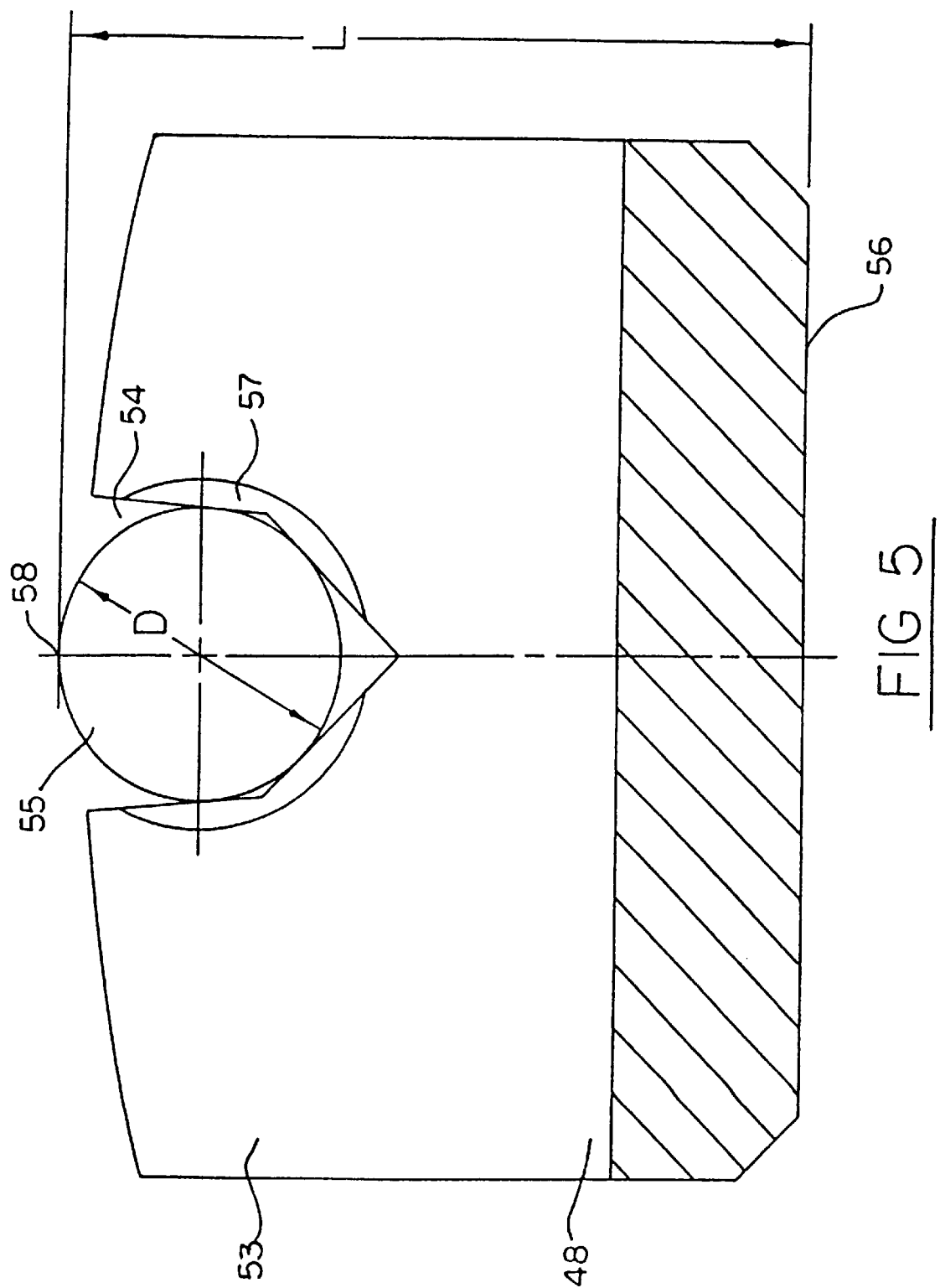

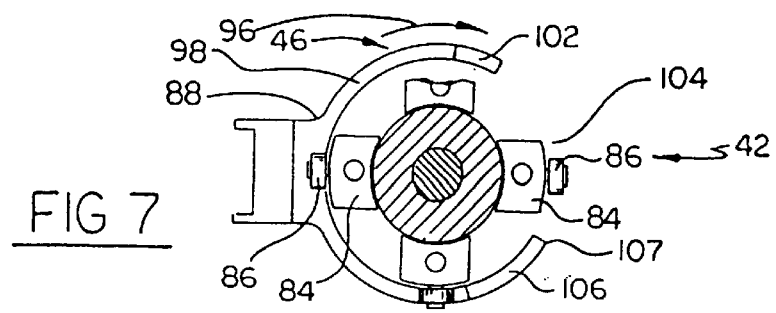
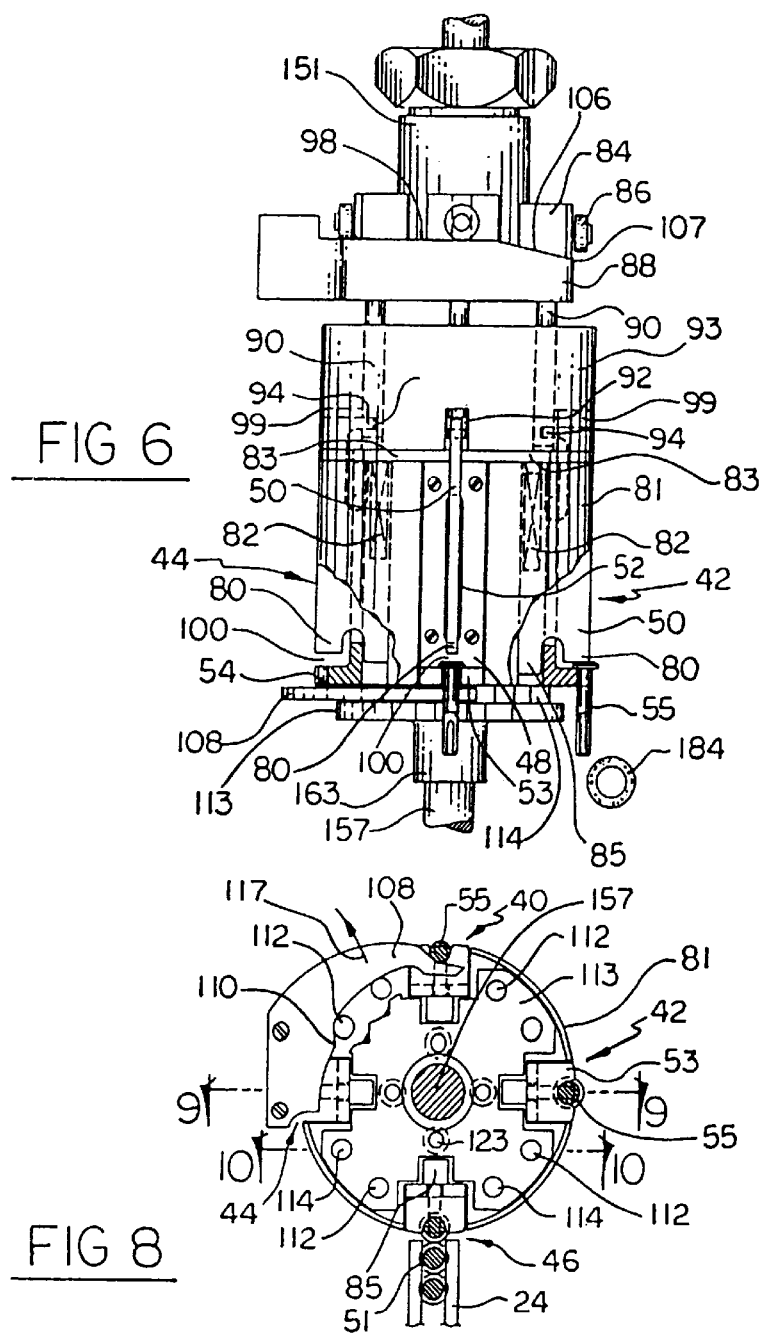

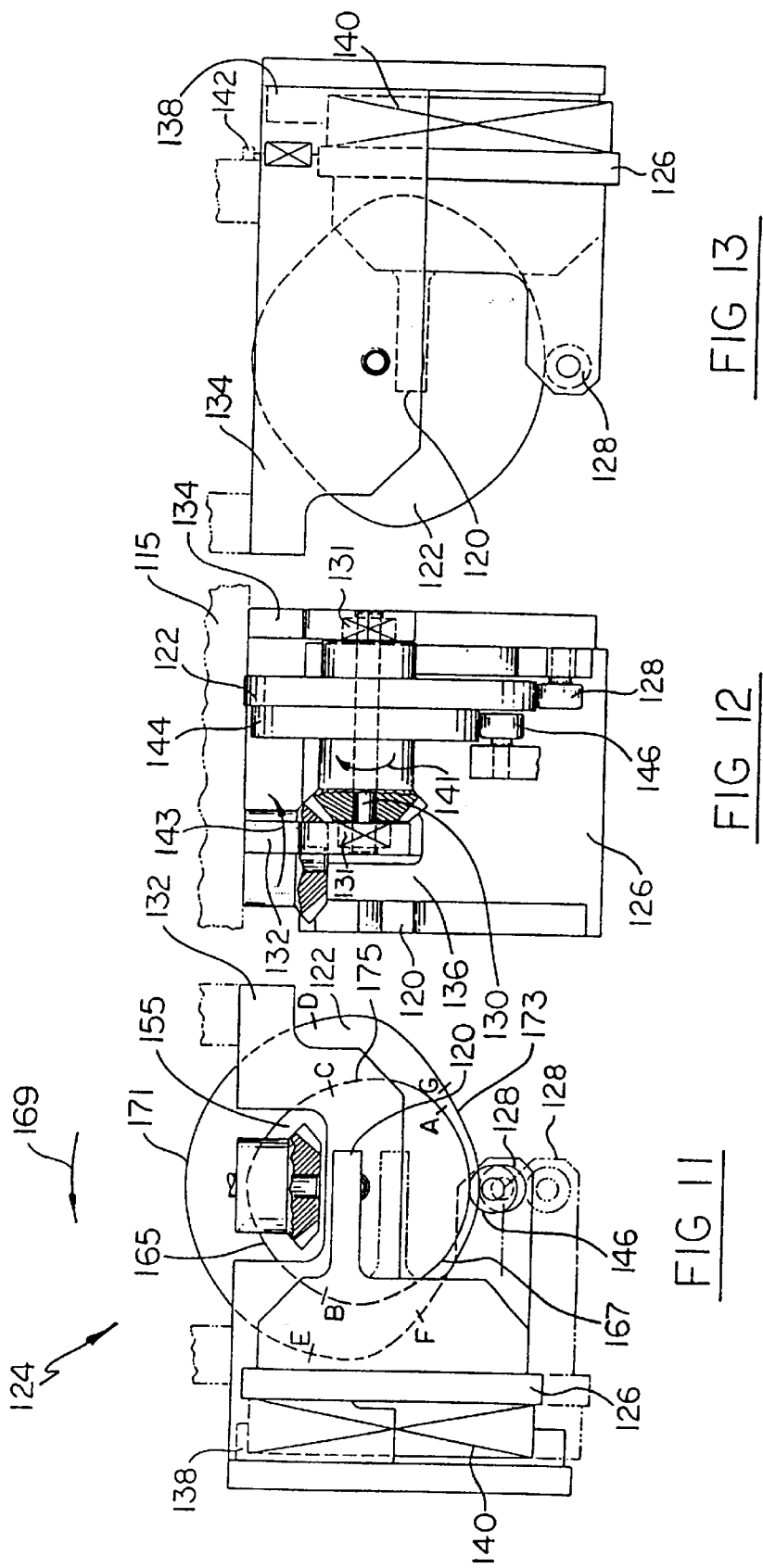

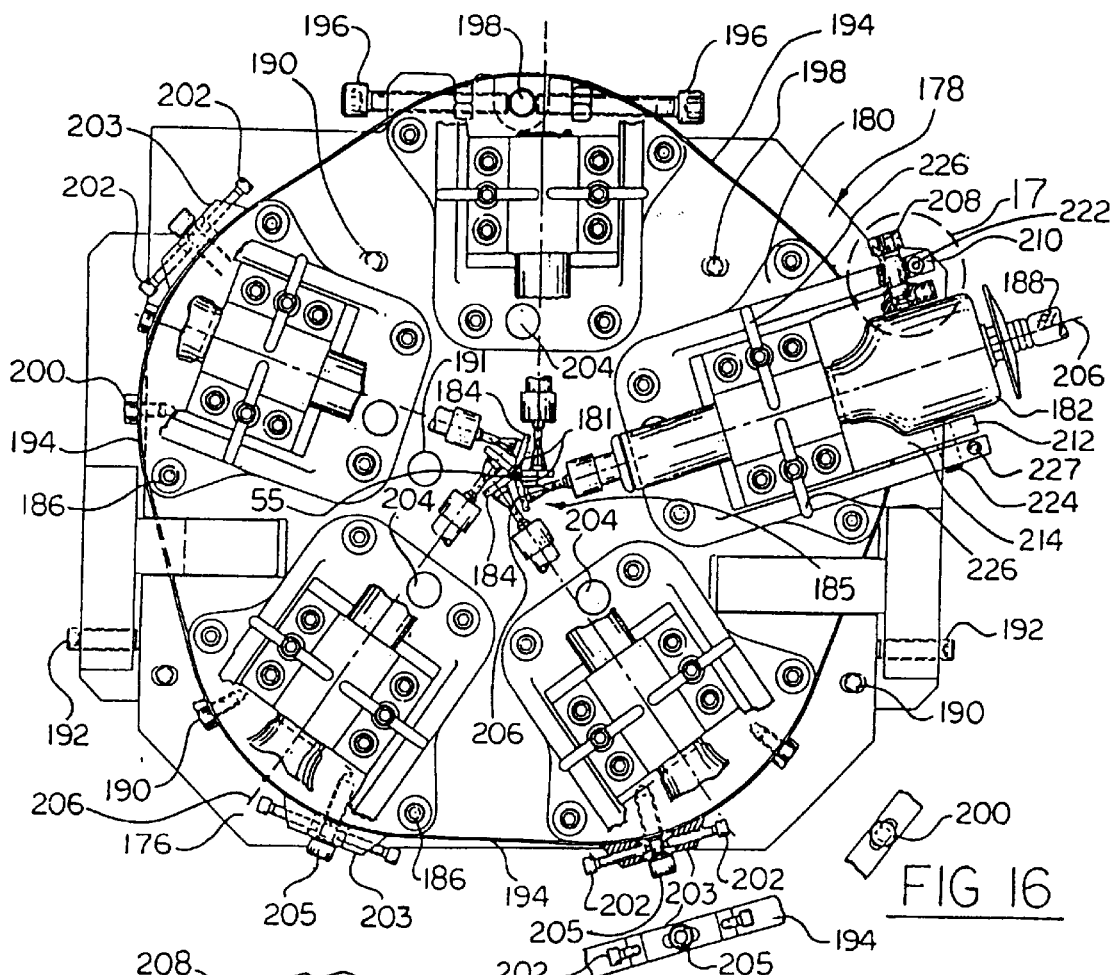
FIG 14
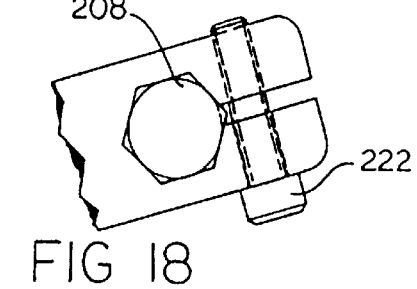
FIG 18
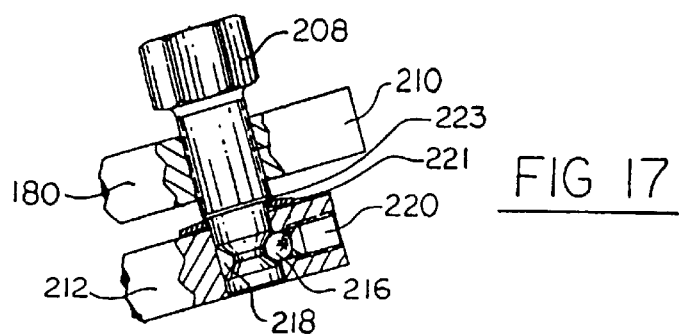
FIG 15
FIG 16
FIG 17

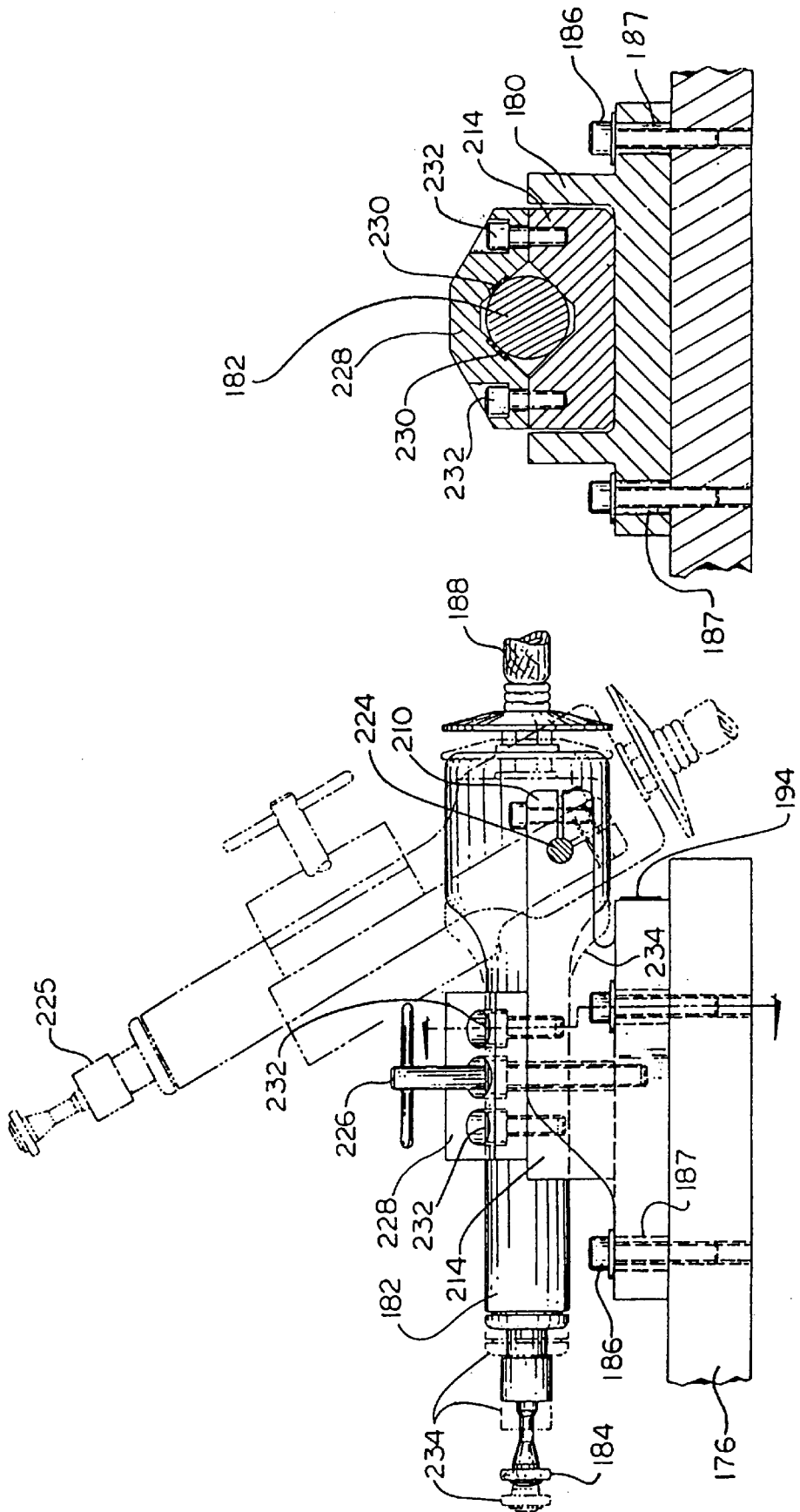

ROTARY DRUM HOLDER

This application is a Div. of Ser. No. 08/951,925 filed Oct. 16, 1997 which is a Div. of Ser. No. 08/536,647 filed Sep. 29, 1995, U.S. Pat. No. 5,716,280.

BACKGROUND OF THE INVENTION

This invention relates to fasteners, methods of manufacturing fasteners, and apparatuses used to manufacture fasteners.

The venerable threaded fasteners consist of a nut and a bolt. The nut has internal threads that thread onto external threads of the bolt. Surfaces of the nut and bolt are formed to receive wrenches which are operated to tightly join the fastener members and one or more pieces together. Broadly, another name for a bolt is a threaded pin, and another name for a nut is a collar.

Many environments in which fasteners are used require the fasteners to have extremely high integrity and strength. Fasteners must bear loads both along a longitudinal axis and radially on the axis. More particularly, when fasteners join together two or more sheets and the sheets are loaded in their planes with different loads, one sheet tends to slide relative to the other. Fasteners passing through both sheets become loaded in shear to prevent the sheets from sliding relative to each other. Axial loads arise from clamping sheets between a head of the pin on one side of the sheets and the collar on the other side of the sheets.

Frequently, fasteners are required to function well in environments where they are cyclically stressed under conditions that could give rise to fatigue failure. A fastener holding two sheets together with an acceptable axial load resists fatigue failure.

An obviously desirable feature of a fasteners is that it does not loosen, fail, or otherwise come apart in service. Many different devices have been used to keep collars and pins together. One way of locking the collar and pin is to deform the threads of the collar so that they bear in radial compression against the threads of the pin. In this method, the resistance to unthreading is purely frictional. The threads are commonly deformed at a manufacturing facility in preference to the field, but field deformation has also been practiced.

It is also highly desirable to know and control the axial load that the fastener is subject to when holding the sheet together. The axial load correlates to the resistance of a collar to further threading onto a pin. As the resistance to further threading increases, the axial load increases, and the torque required to turn the collar increases. These relationships have been used in developed fasteners to provide predetermined axial loads.

In one prior art fastener, a section of a collar adapted to receive a wrench is attached to the main part of the collar by a frangible break neck that breaks upon the application of a predetermined torque corresponding to the desired axial load. The features of a deformed thread lock and a collar with a frangible break neck for axial load control have been combined in one collar. Regrettably, the combination has shortcomings. A thread lock obtained by deformation of the collar threads to form a thread lock, is performed at the factory or in the field before the collar is threaded onto the pin. Thus, the collar does not freely thread onto the pin. This makes threading the collar onto the pin somewhat difficult. Protective and lubricative coatings applied to the threads of the collar to aid threading can be worn off of a collar having this type of thread lock by considerable frictional drag between the threads of the collar and pin. Where corrosion control is important, a circular band of bare metal on the collar is created by failure of the break neck. This band is not protected by corrosion inhibitors applied to the fastener when it was manufactured.

Further, the separation of the collar into two pieces presents several problems. The fact that the section adapted to receive the wrench separates from the threaded section of the collar creates a spare piece that must be removed from the environment where the fastener is attached. This type of fastener is also comparatively expensive because it is difficult to manufacture and requires considerable machining in its formation. The frangible break neck section needs to have very close dimensional tolerances if small variations in break off torques are required. This problem is compounded by machine tool wear in the tools that make the part and also because the break neck section becomes elliptically shaped after the collar threads are deformed to incorporate the thread locking feature into the fastener. Also, the frictional drag between the shear pin and the collar in a fastener system employing a pre-existing deformed thread lock results in a broad range of axial pin loads. The broad range of loads occurs because the drag created by the deformed threads varies greatly among fasteners and is a significant component in the resistance that effects the failure of the frangible break neck. Therefore, the axial load created by the set amount of torque at which the frangible break neck fails varies greatly because of the difficulty in controlling the exact amount of the resistance between the deformed collar and the pin.

A second approach to a locking system employs a pin having an outer groove adapted to receive a deformed collar material. The collar is threaded onto the pin to develop desired axial load, and is then deformed radially inward into the groove so that the deformed collar material is restrained by the walls of the groove and establishes interference. The groove can be made longitudinally or annularly. In one type of such fastener a collar is threaded onto a pin with one setting tool. A second setting tool radially deforms the collar into threads of the pin to effect the interference lock.

To solve these problems, U.S. Pat. Nos. 4,260,005, 4,383,353, and 4,544,312 all to Stencel, the disclosures of which are fully incorporated herein by reference, disclose an improved collar and pin. The collar has external lobes capable of deformation. The deformation of the lobes displaces collar material into an axial bore of the collar, so that the displaced material is brought into interference with a surface of the pin to produce a rotational lock.

The pin has a longitudinally extending shank attached to a head and a plurality of short rounded grooves or flutes extending longitudinally along the shank. Each flute is concave outward in cross section. At the end of the shank opposite the head, roll formed threads cross over the flutes to receive the internal threads of the collar. While being threaded onto the pin, the longitudinally extending lobes on the outer surface of the collar act as a wrenching surface to which a tightening tangential load is applied. Once a determined tangential load or torque is applied, the lobes fail plastically in radial compression. When the lobes plastically deform, material located inwardly from the lobes plastically displaces into the flutes establishing a locking relationship between the collar and the pin created by the interfering material.

To form the pin, the shank of the pin is given a preformed configuration such as that of a generally regular polygon, specifically hexagonal or pentagonal. The corners between the flat sides are rounded. The shank of the pin is then roll formed to introduce threads onto the shank which intersect the flat sides of the shank. The roll forming process deforms material to form the flutes from the flats. The crests of the flutes are formed by radially outwardly displaced shank material formed during the roll forming.

On the collar, each lobe has a convex curvature in radial planes, and the curvatures of the lobes are equal to each other. To make it easy to install a driver onto the collar for tightening, it is preferred that the lobes be located at equally angular distances from each other for example, 120° apart. A driver bears against the lobes with a tangential component force and a component of force in the direction of the axis of the collar.

The collar threads freely onto the work piece of the pin until the collar engages the work piece. Thereupon resistance builds up until the lobes fail inwardly under radial compression. Failure occurs in just a few degrees of arc, and therefore, the amount of axial load on the structure being fastened is determined accurately with small variations. With the failure of the lobes, the setting driver turns freely on the collar indicating that the fastener system is set. Thus, the axial load is controlled without throw-away pieces. Corrosion inhibitors and lubricants are not affected by this deformation.

Though the fasteners of the above patents are made relatively inexpensively, the production of the pins for these fasteners has encountered some inefficiencies. The preforming of the pin shank is a relatively expensive process requiring the fabrication of a cylindrical pin shape and the milling of the desired number of flats onto an end of the pin shank. The precision milling process, which is necessary to produce the preformed pins, is both labor and time intensive. This increases the cost of the pins. After the flats are formed onto the pin, the pin is thread rolled to introduce the threads onto the pin. The flats tend to cause the pins to wobble and otherwise rotate irregularly between the thread rolling dies used in the roll forming process. The irregular rotation of the pins in the dies results in a relatively high scrap rate and increased cost for the pins.

Thus, reduction in the required labor and time for fabricating the pins is desirable to increase the production rate and reduce the production cost of the pins. It is also desirable to reduce the amount of scrap produced during the roll forming process thereby decreasing the cost of producing the pins.

BRIEF SUMMARY OF THE INVENTION

There is, therefore, provided in the practice of this invention a novel method for fabricating self locking fasteners providing set axial loads. The method comprises fabricating a pin and grinding at least one flute on the pin.

In a preferred embodiment of the method, the pin is lubricated and inserted at a feed station into a hold down assembly of a drum assembly wherein it is held between a hold down and an insert blank of the hold down assembly. The drum assembly is then rotated until the hold down assembly is at a grind station and a second hold down assembly is at the feed station. The drum assembly is then temporarily stopped while a second pin is inserted into the second hold down assembly and held by the hold down assembly and the pin is translated into a grinding position. While the pin is in the grinding position, a grinding assembly is cycled up and down past the pin grinding the flutes on the pin. The pin is then translated up out of the grindings position. The drum assembly is again rotated until the hold down assembly is at an eject station, the second hold down assembly is at the grind station, and a third hold down assembly is at the feed station. The rotation of the drum assembly is again temporarily stopped while the pin is released from and falls out of the hold down assembly, the second pin is ground, and a third pin is inserted into the third hold down assembly. After these operations are complete, the drum assembly is again rotated until a fourth hold down assembly is at the feed station, the hold down assembly is at an idle station, the second hold down assembly is at the eject station, and the third hold down assembly is at the grind station. The rotation of the drum assembly is again temporarily stopped while the same operations are performed on the pins. If the pin does not fall out of the hold down assembly at the eject station, an eject arm is actuated by the rotation of the drum assembly and forces the pin out of the hold down assembly. These operations are performed substantially simultaneously. Further, the operations are contiguously repeated to mass produce the pins.

Also provided in the practice of this invention is a novel machine for fluting threaded pin blanks. The machine comprises a hold down assembly which holds the pin while a circular grinding arrangement grinds the pin.

In a preferred embodiment of the machine, a rotary drum assembly having a plurality of hold down assemblies rotates through four stations. A feed track guides the threaded pin blanks past a lubricating mechanism and into a hold down assembly position at a feed station. A grinding assembly grinds the threaded pin blanks held by the hold down assemblies at a grind station. An eject arm assures that the fluted pins are ejected at the eject station. The pin is held between a hold down and an insert blank of the hold down assembly. The hold down is translated up and down to clamp and release the pin by a hold down cam follower attached to the hold down. The hold down cam follower follows a rail cam. At the grind station the entire hold down assembly is pushed down into a grinding position by a push down lever. Both the push down lever and the grinding assembly are controlled by a single cam assembly having two cam wheels. The grinding assembly comprises five grinders arranged in a circular pattern. Multiple means for adjusting the grinders are provided. Rotation is imported to the drum assembly and the cam assembly by a drive mechanism.

There is further provided in the practice of this invention a novel grinding assembly comprising a circular grinding arrangement. In a preferred embodiment, the circular grinding arrangement has at least five grinders. The center of the circular grinding arrangement is adjustable, and the diameter of the circular grinding arrangement is also adjustable. The angles of the grinders which control the diameter of the circular arrangement may be adjusted individually or simultaneously. Further, each grinder can be tilted up out of the assembly for maintenance.

There is still further provided in the practice of this invention a novel rotary drum assembly comprising a plurality of hold down assemblies and means for rotating the drum assembly so that the hold down assemblies rotate through a plurality of stations where operations are performed on pins held by the hold down assemblies.

In a preferred embodiment of the rotary drum assembly, each hold down assembly comprises an insert blank with an aperture for receiving the pins or other work piece and a hold down slidable relative to the insert blank. The hold down is biased in a down position so that it clamps a pin by a hold down compression spring. The hold down is forced to release the head of the pin by a follower following a rail cam. Each hold down assembly is translated in its entirety into a grinding position by a push down lever actuated by a push down cam wheel. The hold down assemblies are biased in the up position by a hold down assembly compression spring. The means for rotating the drum assembly comprises a drive mechanism utilizing an indexer to rotate the drum assembly and pause the drum assembly when the hold down assembly are positioned at the stations. The drum also comprises an outer shell which aids in loading pins into the hold down assemblies.

Also provided in the practice of this invention is a novel pin fastener having a plurality of flutes fabricated by threading the pin and grinding the flutes on the pin.

These and other features and advantages of the present invention will appear front the following Detailed Description and the accompanying drawings in which similar reference characters denote similar elements throughout the several views.

BRIEF DESCRIPTION OF THE DRAWINGS

FIG. 5 is an illustration of how a pin is positioned in an insert blank;

FIG. 6 is an ejection side view in partial cross-section of the drum assembly of FIG. 4 with portions of an outer shell of the drum assembly removed;

FIG. 7 is a partial cross-sectional top view of the drum assembly of FIG. 4 illustrating a rail cam and hold down assembly followers actuated by the rail cam;

FIG. 8 is a partial cross-sectional view of the bottom of the drum assembly of FIG. 4 illustrating the feed track and the ejection arm;

FIG. 11 is an idle side view of the cam assembly;

FIG. 12 is an ejection side view of the cam assembly;

FIG. 13 is a grind side view of the cam assembly;

FIG. 14 is a schematic top down view with detail removed for clarity illustrating a grinder assembly typical of all the grinder assemblies and a mounting plate of the grinding assembly of FIG. 3.

FIG. 15 is a partial side view of the grinding assembly shown in FIG. 14 illustrating an individual pivot base adjustment mechanism;

FIG. 16 is a partial side view of the grinding assembly shown in FIG. 14 illustrating a locking screw for fixing the adjustment made by the individual pivot base adjustment mechanism illustrated in FIG. 15;

FIG. 17 is a partial cross-sectional top view of a grinder adjustment mechanism for the grinder taken from within circle 17 of FIG. 14;

FIG. 18 is a side view of the adjustment mechanism of FIG. 17;

FIG. 19 is a side view of the grinder assembly shown in FIG. 14 illustrating methods for adjusting the position of the grinder;

FIG. 20 is a cross-sectional view of the grinder assembly of FIG. 14 taken along line 20—20 of FIG. 19;

DETAILED DESCRIPTION

I. Overview

Figure 2:
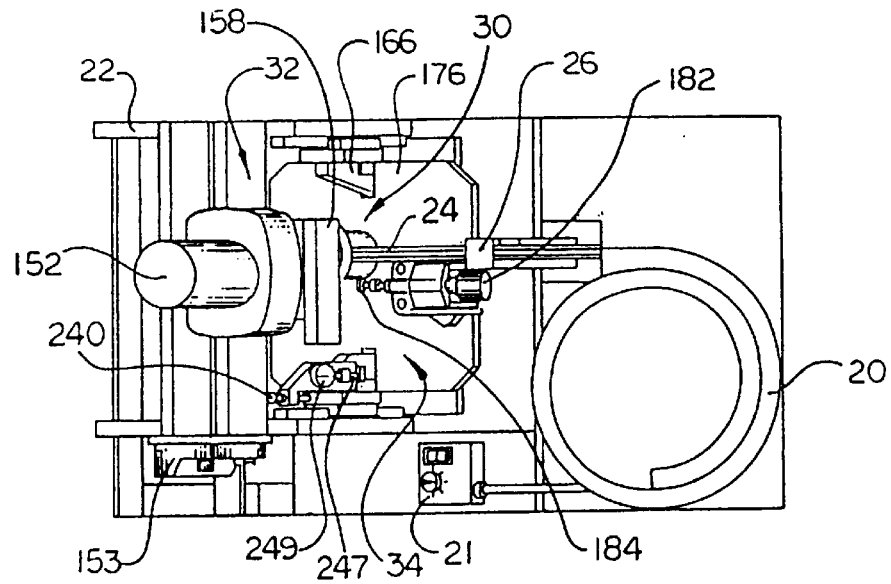
FIG. 2 is a top view of the five spindle fluting machine of FIG. 1.
Figure 1:
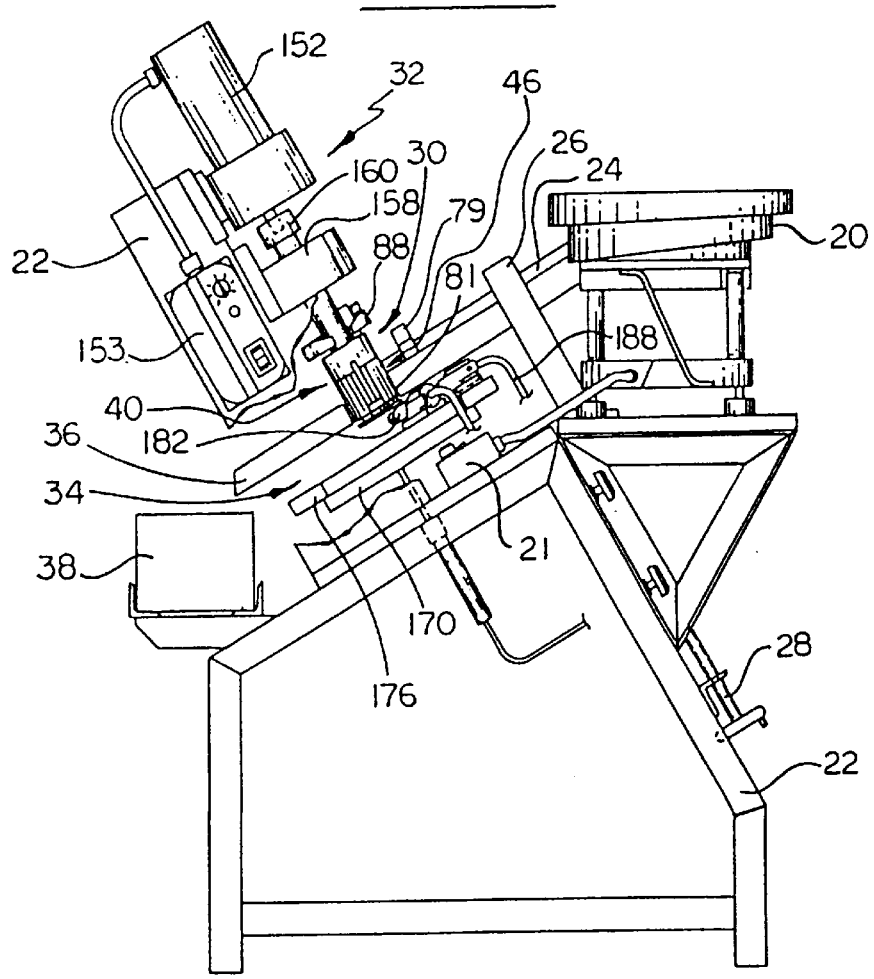
FIG. 1 is a schematic grind side view of a five spindle fluting machine according to the present invention which has been simplified for clarity.

FIGS. 1 and 2 show a five spindle fluting machine according the present invention. The machine comprises a vibratory feed bowl 20 and feed bowl control 21. The feed bowl is adjustably mounted to a support frame 22. A feed track 24, stabilized and supported by a track support 26, extends from the feed bowl. A screw assembly 28 is provided to adjust the height of the track and feed bowl relative to the remainder of the machine. The feed track extends downwardly from the feed bowl at an angle and terminates at a generally circular rotary drum assembly, generally designated 30. The feed bowl orientates the threaded pin blanks loaded therein and transfers them to the feed track. The drum assembly receives the threaded pin blanks from the feed track at a feed station. The screw assembly 28 is used to adjust the height at which the feed track introduces the pins into the drum assembly assuring consistent placement. After the drum assembly has received a pin, a drive mechanism, generally designated 32, rotates the drum assembly until the pin is at a grind station. A grinding assembly, generally designated 34, which is actuated by a cam assembly 124 (FIG. 3), grinds the flutes onto the pin. The drive mechanism then rotates the drum assembly until the pin is at an eject station from which the fluted pin is ejected into a chute 36. The chute guides the fluted pin to a collection pan 38 removably mounted to the frame on the opposite side of the machine from the feed bowl.

II. Drum Assembly

Figure 3:
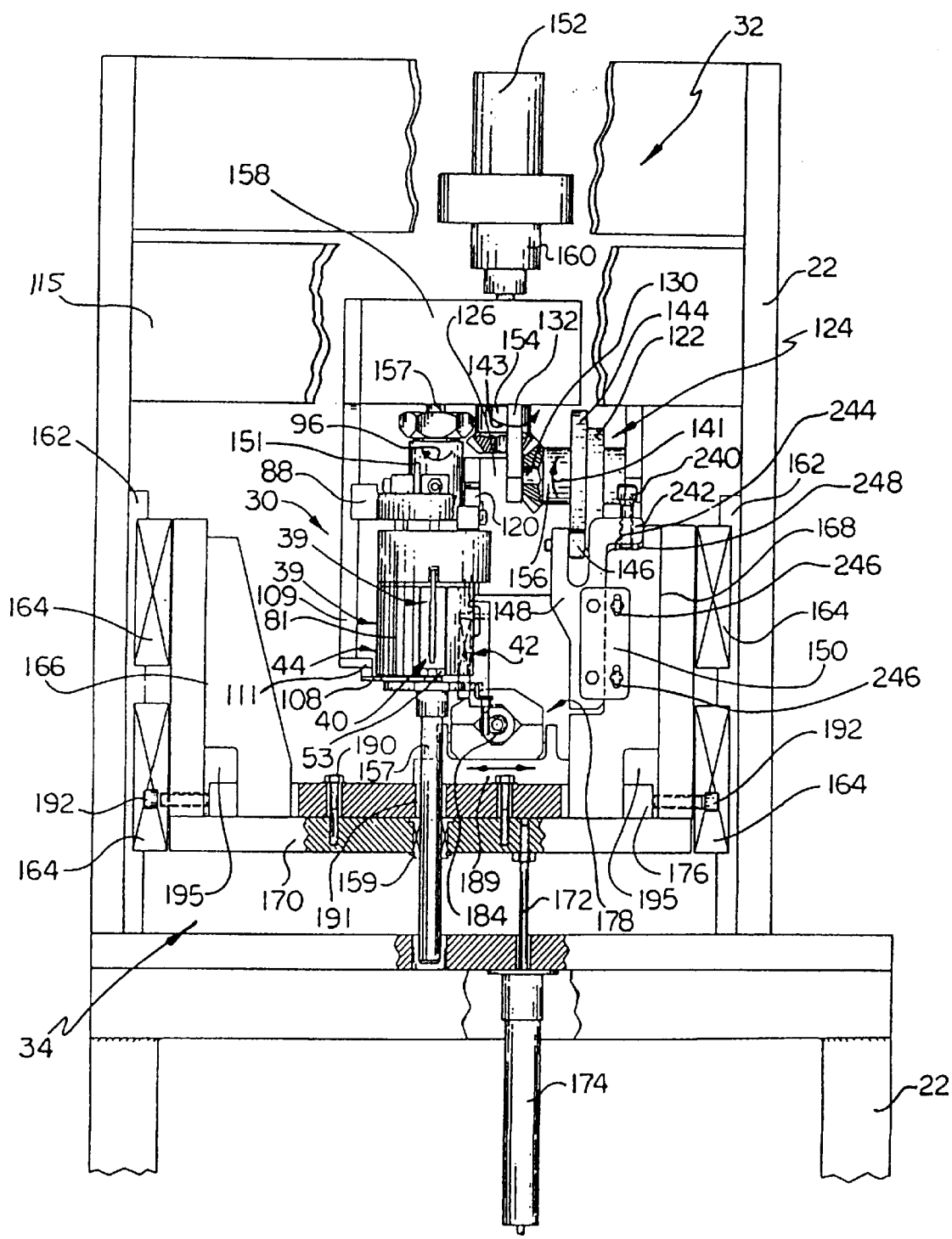
FIG. 3 is a partial ejection side view in partial cross section of the five spindle fluting machine of FIG. 1 illustrating a grinding assembly, cam assembly, and drum assembly.
Figure 4:
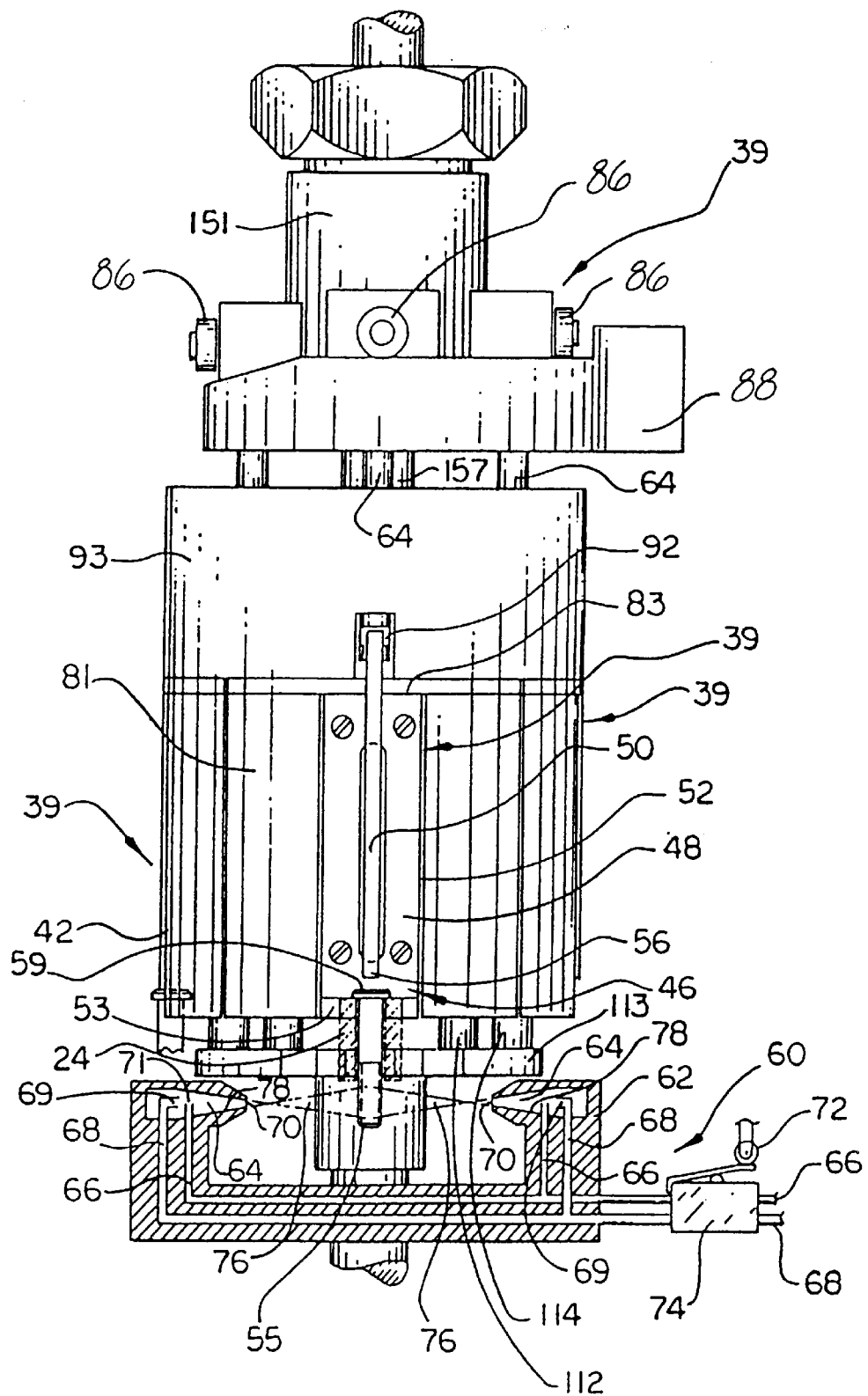
FIG. 4 is a feed side partial cross-sectional view of the drum assembly of the five spindle fluting machine of FIG. 1 illustrating the feed station and lubricating mechanism.

Referring to FIG. 3, the preferred embodiment shown of the rotary drum assembly 30 has four equally spaced rotating hold down assemblies, generally designated 39, which are repeatedly rotated through four stations. More or fewer hold down assemblies and stations could be used depending on the number of operations required or the desired production rate, and tire number of hold down assemblies is not required to equal the number of stations. The hold down assemblies are spaced so that they are simultaneously at a separate station. When the hold down assemblies are positioned at the stations, the rotation of the drum assembly is temporarily stopped, so that the stations can perform their operations. After the operations are complete, the drum assembly is again rotated until the hold down assemblies are positioned at the next stations. Viewing the machine from the eject side shown in FIG. 3, three of the stations are visible: the eject station 40, the grind station 42, and the idle station 44. The fourth station, shown in FIG. 4, is the feed station 46, which is on the opposite side of the drum from the eject station. The drum rotates in a direction so that, starting with the feed station, a hold down assembly is first presented to the feed station, second to the grind station, third to the eject station, and fourth to the idle station. After the idle station, the hold down assembly is again presented to the feed station, and the pattern is started over again and continuously repeated.

A. Hold Down Assembly

Referring to FIG. 4, each hold down assembly 39 comprises an insert blank 48 for receiving pins and a hold down 50 to clamp and hold the pins in the insert blank. The hold down fits through an elongated slot 52 centrally located in the insert blank. The slot is longer than the portion of the hold down that is contained inside the slot, so that the hold down can move up and down within the slot. The lower end of the insert blank, shown in detail in FIG. 5, has a flange 53 protruding radially outward from the drum that defines an aperture 54 for receiving pins 55 from the feed track 24. A counter sink 57 is formed around the aperture which allows the insert blank to receive pins having different types of heads 59. When the diameter D of the pin changes, the insert blank must be changed, and a different size insert blank is required for each pin diameter. The apertures of the insert blanks are sized so that the distance L from the back 56 of the insert blank to the outer edge 58 of the pin is always the same. This requires re-centering of the grinding assembly when the pin diameter is changed, but it prevents the pins from protruding too far out of the drum assembly and contacting stationary parts which could interfere with the operation of the machine. Further, positioning the pin in this manner keeps the head of the pin centered under the hold down thereby preventing the pin from falling out of the hold frown assembly.

Referring to FIGS. 6, 7, and 8, a tip 80 at the lower end of the hold down 50 engages the top of the pin to hold it in the aperture of the insert blank. The hold down assembly at the grind station 42 of FIG. 6 illustrates the down position of the hold down. A schematically shown hold down compression spring 82 (also FIG. 9) biases the hold down toward the down position thereby holding the pin by the head with a compression force between the insert blank flange and the hold down tip. The hold down spring 82 is held in compression between a top plate 83, which is fixed relative to the insert blank 48 and the spring engagement portion 85 of the hold down 50. Thus, the hold down can move within the slot 52 of the insert blank, and the hold down spring 82 biases it toward a down position shown in FIG. 6 at the grind station 42.

B. Rail Cam and Hold Down Assembly Followers

To allow pins to feed into the hold down assembly at the feed station and eject from the hold down assembly at the eject station, each hold down assembly further comprises a follower 84 having a roller 86 which rolls across a rail cam 88. Each follower 84 is connected to a sliding pin 90 passing through the top section 93 of the drum assembly. The sliding pin has a slot 92 at its lower end for receiving a flange 94 on the top of the hold down (also FIG. 9).

The generally circular rail (am functions to lift the followers, slide pins, and hold downs overcoming the force of the hold down spring 82, so that the hold down does not obstruct the placement of pins into and removal of pins out of the insert blanks. As the drum assembly is rotated by the drive mechanism in the direction shown by arrow 96, the followers move through four (4) regions of the rail cam. The majority of the rail cam is comprised by the lifted region 98, which corresponds to the eject, idle, and feed stations. When the follower is in the lifted region, the hold down is lifted up into an opening 99 of the top section 93. When the hold down is lifted up, a gap 100 is left between the hold down tip and the insert blank to allow for insertion and ejection of the pin. Following the rotation of the follower, the downward transition region 102 of the rail cam is next. The downward region extends from just after the feed station to just before the grind station 42. Thus, the roller rolls downward on the rail cam until the hold down tip 80 engages the head of the pin 55. Then the follower rotates through the open region 104 of the discontinuous rail cam. This region corresponds to the grind station. Thus, during grinding, the force of the hold down spring holds the pin tightly between the hold clown tip and the insert blank. The fourth region is the upward transition region 106. The lower edge 107 of the upward region is below the horizontal position of the roller, so that the roller smoothly engages the upward region. When the roller engages this region, the follower and hold down are pulled upward to release the pin for ejection. The remainder of the features and components of the drum assembly will be discussed in the context of the operations of the four stations and the drive mechanism.

C. Feed Station

Referring back to FIG. 4, the operation of each station will now be discussed starting with the feed station. At the feed station of the drum assembly, a lubrication mechanism, generally designated 60, lubricates the pin prior to insertion into the hold down assembly. The lubrication mechanism comprises a lubricant applicator 62 with two nozzles 64 positioned an opposite sides of the applicator with the pin 55 therebetween. A lubricant supply line 66 and an air supply line 68 extend through the applicator to the nozzles. In each nozzle, the tips 69 of the air line are located farther away from the nozzle opening 70 than the tips 71 of the oil line. While the pin is still in the feed track 24, shown in phantom cross section, an oil cam follower 72, which is connected to a grinding follower 146 (FIG. 3) to be discussed later, is actuated by the grinding follower causing a lubricant control mechanism 74 to inject a drop of lubricant into the nozzle. The lubricant used, which is typically an oil, varies dependent on many factors including the material from which the pin is fabricated. Immediately following the injection of the lubricant, the control mechanisms shoots a burst of air out of the nozzle opening. Thus, the lubricant is carried by the air and sprayed onto the pin in a pattern 76, shown in phantom, covering the end of the pin with lubricant. The pattern is controlled by the angles of the internal walls 78 of the nozzle and the size of the nozzle opening 70. Referring to FIG. 8 in addition to FIG. 4, the feed track 24 abuts the drum assembly. The next pin 51 to be loaded into the hold down assembly at the feed station is loaded in one of at least two ways.

The feed track is provided with a timed escapement 79, shown schematically in FIG. 1. The escapement releases a pin when the drum assembly is properly aligned to receive a pin from the feed track into the hold down assembly. Preferably, an outer shell or skirt 81 encloses the drum assembly negating the need for an escapement. The next pins 51 (FIG. 8) to be loaded into the drum assembly rest against and slide over the shell until the opening of the hold down assembly is presented to the feed track. The shell also prevents pins from becoming lodged in the drum assembly which could damage the drum assembly by obstructing its rotation. The shell 81 is broken into four segments which correspond to the hold down assemblies and are translated up and down as part of the hold down assemblies.

Because the feed track is angled downward, gravity moves the pins along the feed track and transfers them from the feed track to the drum assembly. The drum assembly is placed at an angle with the vertical direction, so that the axis of thee drum assembly, which corresponds to a drum shaft 157, is perpendicular to the longitudinal axis of the feed track. Thus, the longitudinal axis of the pins are parallel to the axis of the drum assembly simplifying their insertion into the insert blanks. The angled drum assembly is also advantageous because the hold down does not engage the head of the pin until the hold down follower has rotated at least partially through the down-ward transition region. The angle of the drum assembly utilizes gravity to hold the pin in the insert blank until the hold down engages the pin. This is accomplished by orienting the drum assembly so the feed station is the highest station on the drum assembly making the flange 53 of the insert blank angled upward at the feed station (FIG. 1). An additional component (not shown) has been added to prevent the pin from falling out of the insert blank assuring that the pin stays in the insert blank until the hold down engages the pin. The additional component is desirable to allow the drum assembly to rotate at higher rates without throwing the pins out of the hold down assembly.

D. Eject and Idle Stations

Referring to FIGS. 3 and 8, at the eject station another cam is utilized to eject the pins from the insert blanks. The eject arm 108 has a cam following corner 110 which engages the lead alignment pins 112. The lead alignment pins and the following alignment pins 114 are pressure fitted into the bottom plate 113 and are inserted into the top section 93 of the cerum assembly. The lead alignment pins function both to align the drum assembly and to actuate the eject arm. Thus, the lead alignment pins function as cams. The eject arm is pivotally mounted on a T-support member 109 with a pivoting mechanism 111. The T-support member, which also mounts the rail cam 88, is attached to a cross support bar 115, which is fixed to the support frame 22. When the dxum assembly is rotated, the corner of the eject arm engages the lead alignment pins 112 forcing the eject arm outward as illustrated by arrow 117 thereby pushing the pin 55 out of the insert blank. As discussed above, the tilted orientation of the drum assembly and gravity aid the feeding of the pins into the drum assembly. The ejection of the pins is also aided by the tilted axis of the drum assembly. Referring temporarily back to FIG. 1 it can be seen that the eject station 40 is on the opposite side of the feed station 46, and therefore, the eject station is the lowest station on the tilted drum assembly making the flange 53 of the insert blank 48 angled downward at the eject station. Thus, gravity pulls the pins downward out of the drum assembly.

The idle station is simply that, and therefore, no specific discussion is warranted. However, having an idle station allows for the addition of another operation.

E. Grind Station

Figures 9, 10:
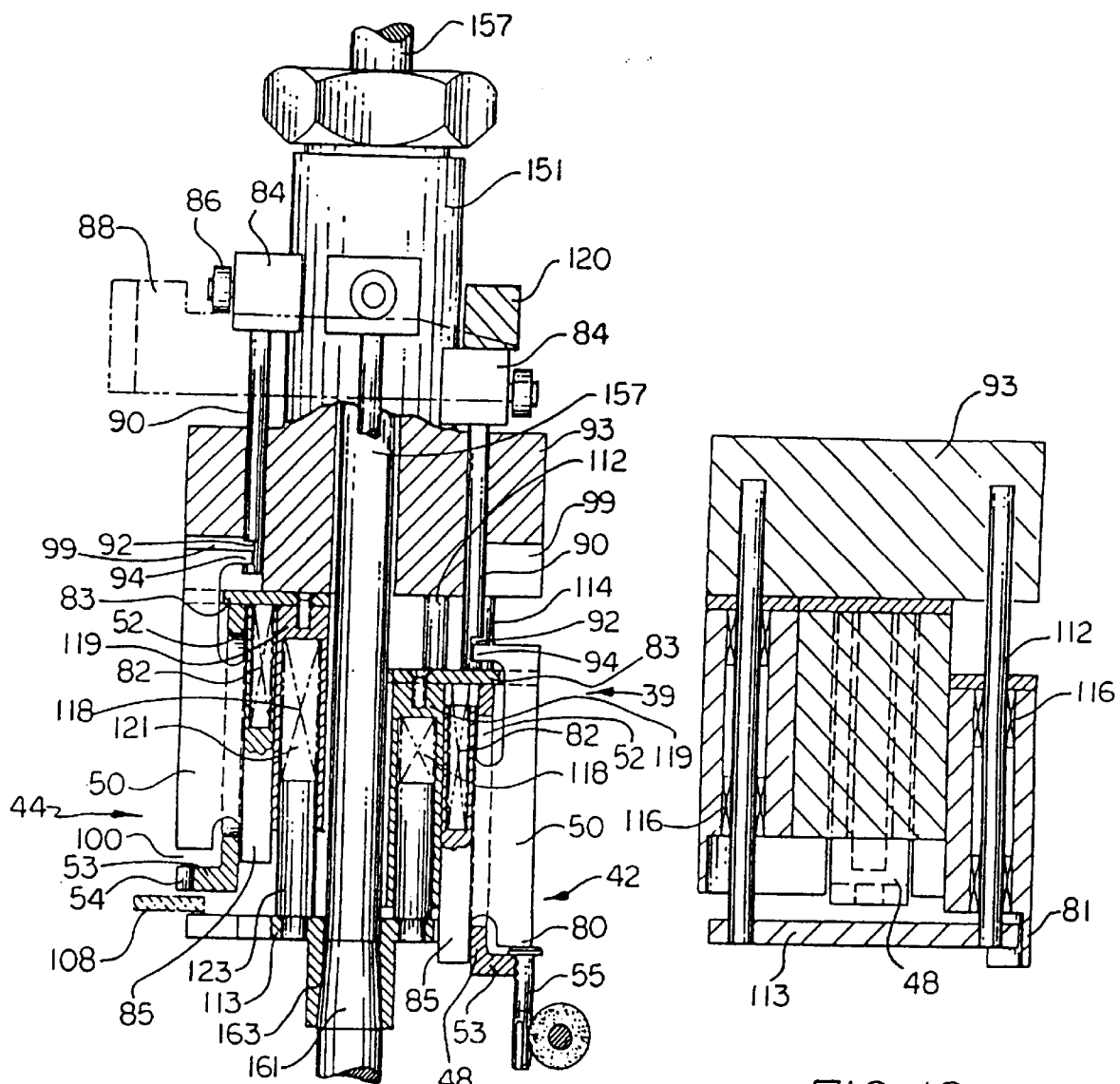
FIG. 9 is a partial cross-sectional view of the drum assembly of FIG. 4 taken along line 9—9 in FIG. 8.
FIG. 10 is a partial cross-sectional view of the drum assembly shown in FIG. 4 taken along line 10—10 of FIG. 8.

Referring to FIGS. 9 and 10, the fourth and final station to discuss is the grind station 42. As discussed above, the region of the rail cam corresponding to the grind station is the open region 104. This region is open so that an entire hold down assembly of the drum positioned at the grind station can be pushed downward to place the pin in a grinding position shown in FIG. 9. The entire hold down assembly is free to translate downward on the lead alignment pins 112 and the following alignment pins 114 because the alignment pins are engaged by linear slide bearings 116 shown schematically in FIG. 10. A hold down assembly compression spring 118 (shown schematically) biases the hold down assembly in the up position. The hold down compression spring is contained by a spring holder 119 having a central opening 121 for receiving the spring 118. A spring pin 123, which is press fit into the bottom plate 113 of the drum assembly, fits into the central opening 121 of the spring holder and holds the spring in compression therein. To move the entire hold down assembly into the grinding position shown in FIG. 9, the force of the hold down assembly compression spring is overcome by a cam-actuated push down lever 120.

III. Cam Assembly

A push down cam wheel 122 which is part of the cam assembly, generally designated 124 and shown in FIG. 3, actuates the push down lever. FIGS. 11–13 show a detail of the cam assembly 124. The push down lever 120 engages the follower 84 of the hold down assembly positioned at the grind station to push the hold down assembly into the grinding position. (FIG. 9) The push down lever is attached to a backing plate 126 which is attached at its other end to a push down follower 128 which follows the push down cam wheel. The upper position of the push down lever is shown with solid lines in FIG. 11, and the down position is shown in phantom lines. As the cam assembly shaft 130 rotates in bearings 131 held by support arms 132, 134, the push down cam wheel moves the push down follower, and hence the push down lever, up and down. The push down lever in turn acts on the hold down follower to push the pin held by the hold down assembly into the grinding position.

The cam assembly is held to the support structure with the support arms 132 and 134 which are attached to the cross support bar 115 shown in phantom in FIG. 12. The left support arm 132 extends through an aperture 136 in the push down backing plate 126. A roller type bearing 140 (shown schematically), is attached to the push down backing plate 126 and slidably engages a track way 138 defined by the support arms. Thus, the backing plate moves up and down relative to the support arms. The push down lever backing plate and follower are biased in the upper position by push down tension spring 142. Thus, the push down tension spring holds the push down cam follower against the push down cam wheel. After the push down lever pushes the hold down assembly into the grind position, the grinding assembly 34 is cycled up and down to grind the pin. The detail of the grinding assembly will be discussed below. However, it is advantageous to discuss the cycling of the grinding assembly at this point.

The cam assembly 124 also includes grinding cam wheel 144. A corresponding grinding follower 146 is attached to an adjustment bracket 148 which is attached with a flat bracket 150 to the grinding assembly 34. As the cam assembly shaft rotates, the grinding follower and the grinding assembly to which it is indirectly attached are cycled up and down past the pin thereby grinding the pin. The length of the grinding assembly's cycle is constant and corresponds to the change in diameter of the grinding cam. A flute length adjustment screw 240 threads through an arm 242 of the adjustment bracket and engages an upper surface 244 of the grinding assembly normal to the length of the flute length adjustment screw. The flat bracket has slotted apertures 246 allowing the grinding assembly to move relative to the cam follower. By threading the screw 240 farther into the arm 242, the gap 248 between the arm and the grinding assembly is increased, and thus, the grinding assembly is farther away from the cam follower and the pin in the grinding position. Therefore, when the grinding assembly is cycled to grind the pin, the pin is ground over a shorter portion of the grinding assembly's cycle length, and the flutes are shorter. By threading the screw 240 farther out of the arm 242, the gap 248 is decreased, and thus, the grinding assembly is closer to the pin in the grinding position when the cycle is started. Therefore, because the pin is ground over a greater portion of the cycle of the grinding assembly, threading the flute length adjustment screw out of the adjustment bracket arm lengthens the flutes. Referring temporarily to FIG. 2, a position sensing device 247 such as a micrometer with a dial indicator 249 senses the length between the grinding assembly and any fixed point on the machine. The dial indicator is calibrated to display the flute length. If pins having different lengths are to be ground, the dial indicator must be recalibrated.

The grinding cam appears substantially circular because only a short stroke is required to grind the pin. However, the grind cam has three (3) different arcs: a cycling down arc 175 defined by arc segment AC, a grinding arc 165 defined by arc segment AB, and a down position arc 167 defined by arc segment BA. The arc segments are defined by the direction of rotation of the cams shown by arrow 169. The grinding and cycling down arcs have a smaller diameter than the down position arc 167, and when the grinding follower is following the grinding arc, the grinding assembly is translated upward thereby grinding the pin. When the grinding follower is following the cycling down arc, the grinding assembly is translated downward. To this end, the grinding and cycling arcs do not have constant diameters unlike the down position arc. As the grind cam rotates, grinding arc segment CB contacts the grinding follower 146 and translates the grinding assembly upward. Point C is the point having the smallest diameter and corresponds to the grinding assembly being in the highest position. The grinding arc segment CB changes diameter gradually so that the grinding moves at a slower pace while moving upwardly. It is during upward movement that the grinding actually takes place. The cycling arc segment AC moves the grinding assembly downward to the down position. The arc segment AC is shorter than segment CB so the segment AC changes diameter quickly relative to segment CB, and the grinding assembly moves quickly downward. Thus the grinding assembly is translated upward during actual material removal at a slower pace then it is translated downward. The grinding assembly can be translated downwardly at a faster pace because it is not further grinding the pin. The grinding arc segment AB corresponds to a push down arc 171 of the push down cam.

The push down arc 171 defined by segment DE is a constant diameter and functions to push the hold down assembly downward placing the pin in the grinding position. Because the respective cam followers are engaging the push down arc and the grinding arc at the same time, the pin is pushed into the grinding position the entire time that the grinding assembly is moving upwardly to grind the pin. Arcs defined by segments EF and GD translate the hold down assembly into the down position (FIG. 9) and into the up position (FIG. 6) respectively. These segments are characterized by high acceleration. The high acceleration translates the hold down assembly to the up and down positions quickly, so the drum can be rotated with minimal pause at the stations. The cycling down arc segment AC corresponds to the arc segment GD which translate the hold down assembly to the up position. Thus, the hold down assembly is translated to the up position simultaneously with the cycling down of the grinding assembly. Arc segment ED corresponds generally to the down position arc segment BA, so the hold down assembly is in the up position when the grinding assembly is in the down position.

IV. Drive Mechanism

Referring to FIGS. 1 and 3, rotation in the direction of arrow 141 is imparted to the can assembly shaft 130 by the drive mechanism 32. The drive mechanism includes a motor 152 which transmits rotation around an axis to a first bevel gear 154 which rotates in an opening 155 (FIG. 11) of the support arm 132 and in the direction of arrow 143. The motor of the drive assembly has a corresponding controller 153 capable of turning the motor on and off and controlling the speed of the motor and hence the rate of production. The first bevel gear engages a horizontal bevel gear 156 which is fixed to the cam assembly shaft.

Referring additionally to FIG. 7, the drive mechanism is also the rotational means for the drum assembly in the direction of arrow 96. However, the rotation of the drum assembly is not constant. The drive mechanism, therefore, utilizes an indexer 158 to hold the drum assembly stationary for short periods of time, so that the necessary operations at the different stations can be performed. The indexer rotates the drum exactly one quarter rotation each time it indexes. The indexer transmits rotation in the direction of arrow 96 from the motor to a drum drive shaft 157 passing centrally through the drum. At the bottom of the drum the drum drive shaft has a downwardly increasing diameter region 161. A boss 163 extending downward from the bottom plate 113 has an inner diameter which increases in the downward direction. Thus, the collar engages the increased diameter region preventing the drum assembly from sliding down the drum drive shaft. The upper part of the drum assembly is rotationally fixed to the drum drive shaft with a set screw (not shown). Further, the drum drive shaft is in two pieces, so a collet assembly 151 is provided to connect the pieces of the drum drive shaft. The drive assembly also includes a torque tender 160 as a safety mechanism to prevent damage to the motor should the drum assembly or cam assembly become obstructed and prevented from rotation.

V. Grinding Assembly

Referring again to FIG. 3, the grinding assembly is free to cycle up and down on the support frame 22 inside of a track way 162 attached to the support frame. Linear bearings 164 (schematically shown) are attached to the grinding assembly and slide in the trackway 162. Specifically, the bearings are attached to the bearing support 166 and adjustment bearing support 168 which are in turn attached to the grinding assembly base plate 170. The drum drive shaft 157 extends through the drum and down into the base plate 170 thereby aligning the drum with the base plate. A bearing 159 allows the base plate to slide over the drum drive shaft. An air shaft 172 of an air cylinder 174 biases the entire grinding assembly in the up position shown in FIG. 3. Thus, during operation, the grinding follower is held against the grinding cam by the force exerted by the air cylinder on the base plate. The grinding cam 144, discussed above, causes the grinding assembly to cycle into the down position while the drum is rotating, and when the drum is stopped the push down cam push the pin into the grinding position and the grinding cam cycles the grinding assembly up and down to grind the pin.

Referring to FIG. 14, a grinder mounting plate 176 is mounted onto the top of the base plate 170, and five grinder assemblies, generally designated 178, are mounted on the grinder mounting plate. Though five grinders are used in the preferred embodiment shown, more or fewer grinders can be provided. Each grinder assembly, all of which are substantially the same, comprises a pivot base 180 in which a grinder 182 is adjustably mounted. The grinders are positioned so that the grinding wheels 184 form a circular grinding arrangement, generally designated 185, around the pin 55. The inner most radial points 181 of the grinding wheels form a circle with a diameter smaller than the diameter of the pin. Thus, the grinding wheels grind away material to form the flutes. It is also true that the outer most radial points and the centers of the grinding wheels define circles. Further, the longitudinal axes 206 of the grinders are tangential to a circle.

The pivot bases are mounted to the mounting plate with frictional hold down towers 186, which when tightened, prevent the pivot bases from moving relative to the mounting plate. The apertures 187 of the towers are enlarged to allow the pivot bases to adjust relative to the mounting plate. (FIG. 20) The grinders are pneumatically powered and rotate at approximately 40,000 rpm. The grinders are supplied with air by air hoses 188.

A. Grinding Assembly Adjustments

Because precise positioning of the grinding assembly is necessary, many adjustments means are incorporated into the grinding assembly. When the diameter of the pin is changed, the center of the grinding arrangement Must be adjusted in the direction defined by arrow 189. This adjustment is accomplished by loosening the fasteners 190 between the base plate and the mounting plate, turning adjustment screws 192 in conjunction thereby repositioning the center of the grinding arrangement, and retightening the fasteners 190 between the base plate and the mounting plate. The mounting plate has an aperture 191 (also FIG. 3) with a greater diameter than the drum shaft 157 that passes therethrough allowing the mounting plate to slide relative to the drum assembly.

It is also necessary to adjust the angles of the grinders in the grinding arrangement to accommodate different pin diameters. To this end, a band 194 is placed around the pivot bases 180. The band passes through tunnels 195 in the bearing supports 166, 168. By simultaneously turning the band adjustment screws 196 which engage a fixed pin 198 the angles of all the grinders are adjusted simultaneously. Referring to FIGS. 14, 15, and 16, the angles of individual grinders are adjusted by loosening a band attachment screw 200 corresponding to the grinder to be adjusted, and simultaneously turning the pivot base adjustment screws 202 of the individual pivot base adjustment mechanism 203 which is welded to the band 194. The pivot base adjustment screws engage a pin 205 which is fixed in the pivot base to adjust the angles of the pivot base and grinder. The band attachment screw 200 is then retightened to secure the adjustment. Whether adjusting all of the pivot bases or just one, the angles of the pivot bases and grinders are adjusted about fixed pivot pins 204.

The individual grinders may also be adjusted in a direction perpendicular to their longitudinal axis 206. Referring to FIGS. 17 and 18, a grinder adjustment screw 208 is threaded into a vertical wall 210 of the pivot base 180. The end of the grinder adjustment screw is fixed inside of a wall 212 of a saddle block 214 with a metal ball 216 forced into a groove 218 of the adjustment screw by threaded member 220. To keep the saddle block in position relative to the grinder adjustment screw, spring washer 221 engages a shoulder 223 of the grinder adjustment screw and the wall 212. By loosening the clamping screw 222 the adjustment screw 208 is free to be threaded in and out of the vertical wall of the pivoting base. Thus, the grinder may be adjusted in a direction perpendicular to its longitudinal axis within the vertical walls of the pivot base.

B. Grinder Assembly

Referring to FIGS. 14 and 15, it is occasionally necessary to change the grinding wheels of the grinder. To this end, the grinder assembly is provided with a tilt up feature by which the grinder is tilted upwardly 60° as shown in phantom lines 225 in FIG. 19. To tilt the grinder, the clamping screw 222 and a friction clamping screw 227 are loosened. The saddle block and grinder pivot upward around pivot pin 224 and adjustment screw 208. The ball and groove arrangement of the adjustment screw allows the saddle block to pivot within the vertical wall of the pivot base because thee ball bearing rolls in the groove of the adjustment screw. The saddle block is loosened from the pivot base simply by loosening two bolts 225 corresponding to handles 226 on each side of the saddle block.

Referring additionally to FIG. 20, the grinder is held between the saddle block 214 and a saddle clamp 228. Plastic members 230 in the saddle clamp cushion the grinder inside the saddle block and saddle clamp. By loosening the bolts 232 attaching the saddle clamp to the saddle block, the grinder may be adjusted longitudinally as illustrated by phantom lines 234.

VI. The Pins

Figure 22:
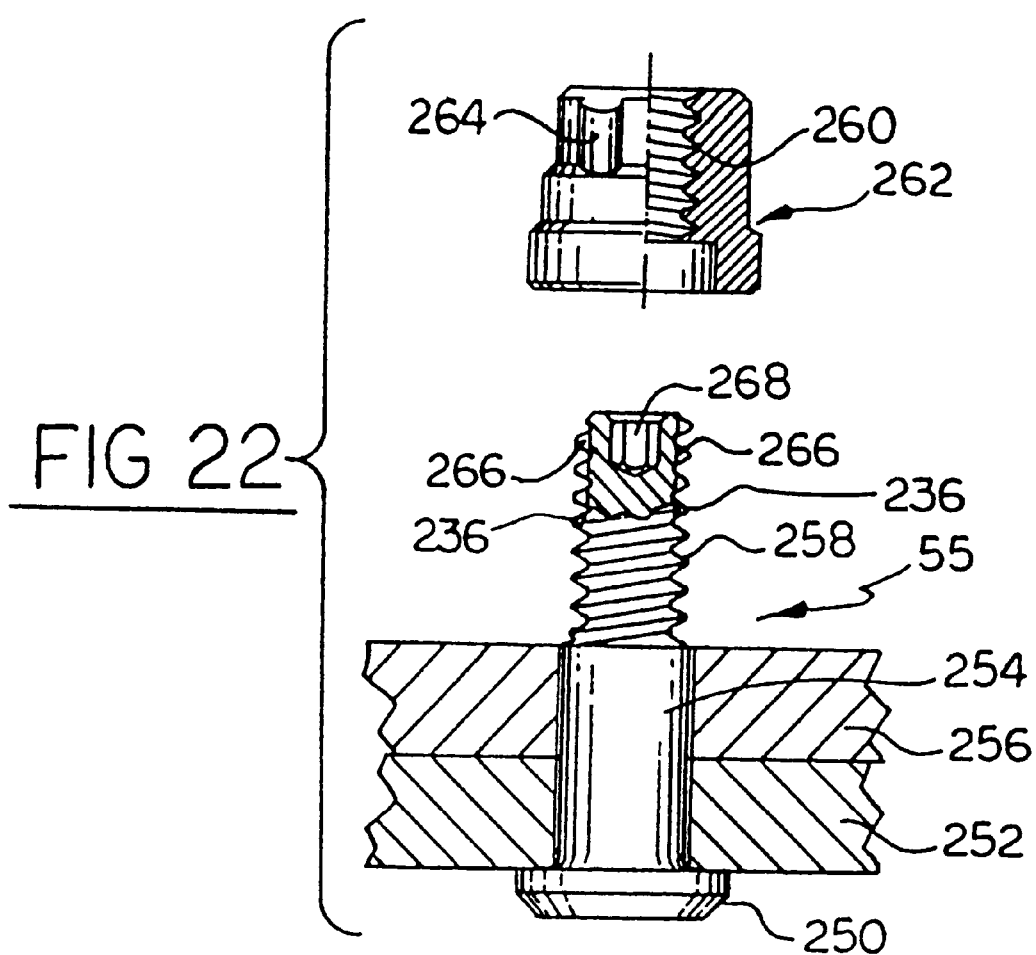
FIG. 22 is an exploded view of a fastener having a pin fabricated according to the present invention just before the collar is threaded onto the pin to complete the fastener.
Figure 21:
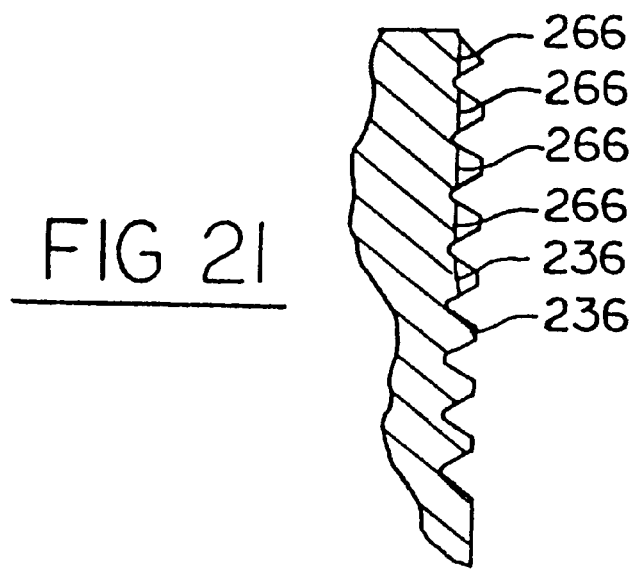
FIG. 21 is an enlarged cross-sectional view of a pin fabricated by the five spindle fluting machine of FIG. 1 illustrating flute run out.

The pins which are a product of this process are shown in FIGS. 21 and 22. The flute that has been ground into the threads of the pin has a run out area 236. The run out area is located at the end of the flute towards the head of the pin and is created because of the circular grinding wheels. The run out in no way interferes with the function of the fastener. As FIG. 22 illustrates, the fastener produced by the present process functions similar to the fasteners disclosed in the Stencel patents cited herein. The head 250 of the fastener 55 engages a plate 252 and the shaft 254 of the pin extends through apertures in the plate 252 and a second plate 256. The external threads 258 of the pin are engaged by the internal threads 260 of the collar 262. A fastening tool (not shown) engages the semicircular convex lobes 264 to tighten the collar onto the pin. At the desired amount of torque, the fastening tool plastically deforms the lobes pushing material inwardly into the flutes 266 thereby securing the collar to the pin and providing a desired axial load. The pin is held from rotation during the tightening process by utilizing the wrenching surfaces 268 internally located at the threaded end of the pin 55.

VII. Operation of Machine for the Mass production of Pins

In operation, the five spindle fluting machine disclosed is capable of the mass production of the pin of the described fastener. Large quantities of threaded pin blanks are loaded into the feed bowl in any orientation. The feed bowl properly orients the threaded pin blanks and transfers them to the feed track. The feed track becomes filled with threaded pin blanks over its entire length and remains filled if the feed bowl is supplied with pins. During rotation of the drum assembly, the threaded pin blanks in the feed track slide against the shell until the aperture of the insert blank is properly aligned with the feed track. A first pin, aided by gravity acting on the pin and the other pins pushing thereon, is loaded into the aperture of the insert blank of a first hold down assembly. The drum assembly then rotates through one-quarter arc until the first hold down assembly is at the grind station and a second hold down assembly is at the feed station. While the drum assembly is temporarily stopped, the first pin is ground while a second pin is simultaneously loaded into the second hold down assembly. The drum assembly then rotates again until a third hold down assembly is at the feed station, the second hold down assembly is at the grind station, and the first hold down assembly is at the eject station. Simultaneously, a third pin is fed into the third hold down assembly, the second pin in the second hold down assembly is fluted, and the first pin falls out of the first hold down assembly aided only by gravity. The drum assembly is again rotated, and if the first pin was not ejected by gravity, the ejection arm will extend outward and eject the pin into the chute. Thus, the ejection arm assures that the pin is ejected. The drum assembly stops rotating when a fourth hold down assembly is at the feed station, the third hold down assembly is at the grind station, the second hold down assembly is at the eject station, and the first hold down assembly is at the idle station. Again substantially simultaneously, a fourth pin is inserted into the fourth hold down assembly, the third pin in the third hold down assembly is ground, and the second pin falls from the second hold down assembly. The drum assembly rotates until first hold down assembly is again at the feed station. This process is continuously repeated providing the mass production of the pin of the fastener.

Thus, a fluting machine is disclosed which utilizes a circular arrangement of grinders to more efficiently manufacture self locking fasteners which provide set axial loads. While embodiments and applications of this invention have been shown and described, it is apparent to those skilled in the art that many more modifications are possible without departing from the inventive concepts herein. It is, therefore, to be understood that within the scope of the appended claims, this invention may be practiced otherwise than as specifically described.

What is claimed is:

1. A rotary drum pin blanks work holder comprising:

a plurality of hold down assemblies for receiving and rigidly holding the pin blanks;

wherein the hold down assemblies comprise a slidable hold down and an insert blank having an aperture for receiving the pin blanks wherein the hold down is translated up and down to clamp and release the pin by a hold down cam follower attached to the hold down which follows a cam rail; and means for rotating the drum assembly so that the hold down assemblies rotate through a plurality of stations in which operations are performed on the pin blanks.

2. The rotary drum work holder of claim 1 wherein the hold down assembly is pushed down into a grinding position by a push down lever and wherein the push down lever is controlled by a single cam assembly having two cam wheels.

3. The rotary drum work holder of claim 1 wherein the means for rotating is a drive mechanism utilizing an indexer to rotate the rotary drum assembly.

* * * * *